United States Patent [19]

Proctor

[11] Patent Number: 4,497,090

[45] Date of Patent: Feb. 5, 1985

[54] WIRE GRIP CLAMP WITH RADIALLY-DIRECTED SCREW TAKE-UP

[75] Inventor: Robert H. Proctor, Cockeysville, Md.

[73] Assignee: Murray Corporation, Cockeysville, Md.

[21] Appl. No.: 476,987

[22] Filed: Mar. 21, 1983

[51] Int. Cl.³ .............................................. B65D 63/02
[52] U.S. Cl. ............................... 24/20 R; 24/274 WB; 24/278; 24/283
[58] Field of Search ............... 24/20 R, 20 LS, 22, 24/26, 27, 29, 19, 274 WB, 278, 283; 285/253

[56] References Cited

U.S. PATENT DOCUMENTS

| | | | |
|---|---|---|---|
| 1,992,505 | 2/1935 | Prosky | 24/274 WB |
| 2,503,189 | 4/1950 | Biba, Jr. | 24/278 |
| 2,503,223 | 4/1950 | Stade | 24/278 |
| 2,536,612 | 1/1951 | Murray | 24/283 |
| 2,561,635 | 7/1951 | Prochaska | 24/283 |
| 2,998,628 | 9/1961 | Klug | 24/278 |
| 3,407,448 | 10/1968 | Tetzlaff et al. | 285/253 |
| 3,407,449 | 10/1968 | Tetzlaff et al. | 285/253 |
| 3,426,401 | 2/1969 | Denyes | 24/278 |
| 3,454,996 | 7/1969 | Tetzlaff et al. | 24/283 |

Primary Examiner—Victor N. Sakran
Attorney, Agent, or Firm—Irvin A. Lavine

[57] ABSTRACT

A radially-adjustable wire grip hose clamp made of a single wire strand forming a pair of coaxial, axially-spaced clamping loops. Each loop having a portion progressively traversing a seat element as said clamp is adjusted by a radially-disposed screw threadedly engaging a nut and bearing upon the seat element. The traversing portions are maintained at equal length to stabilize the screw against tipping and a mechanical interlock configuration of bends retains the nut against torsion-induced angular displacement.

13 Claims, 10 Drawing Figures

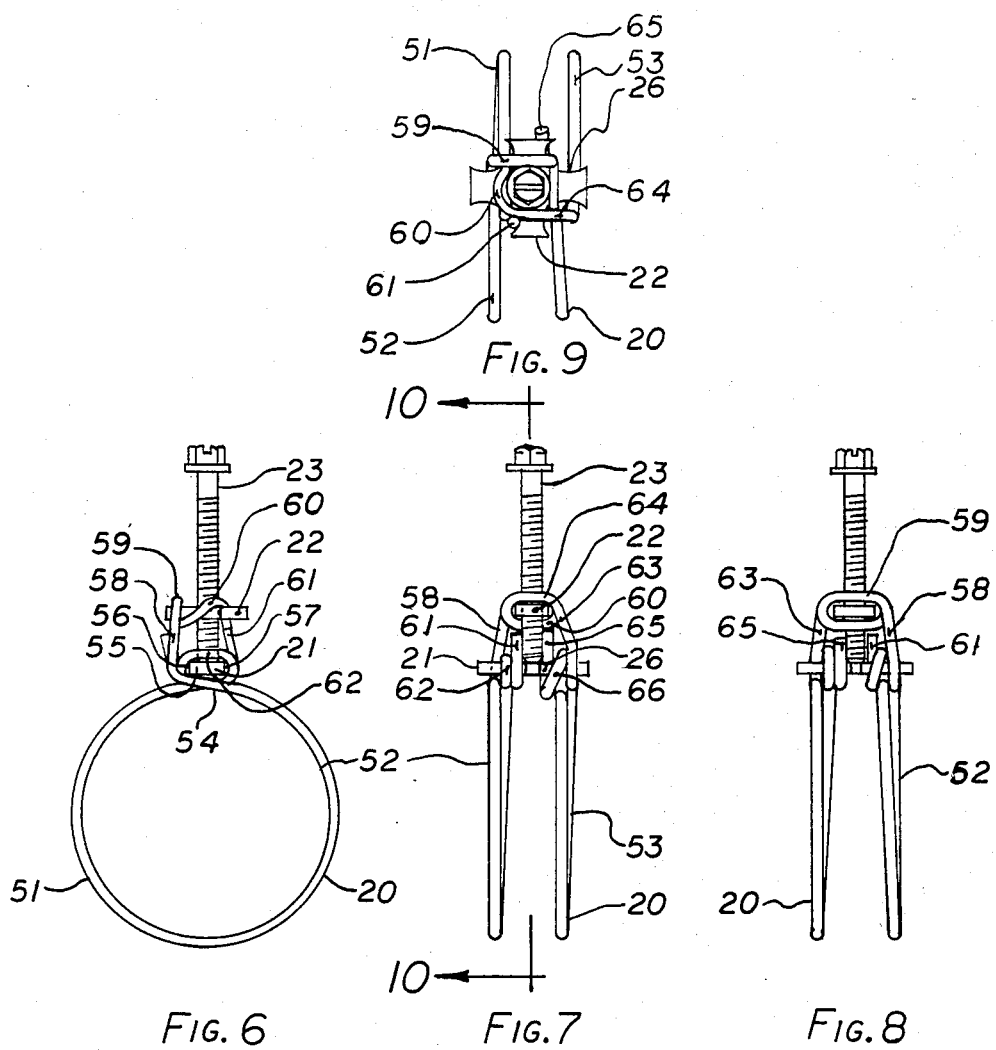
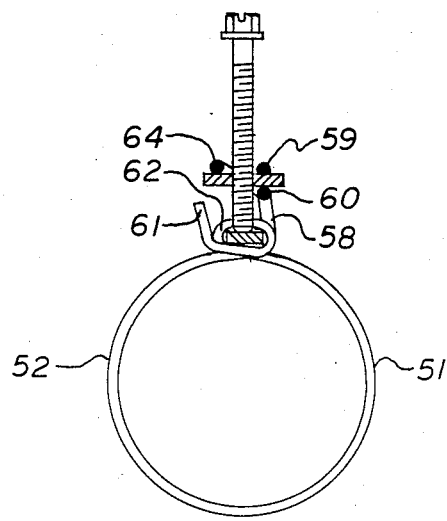

WIRE GRIP CLAMP WITH RADIALLY-DIRECTED SCREW TAKE-UP

BACKGROUND OF THE INVENTION

The use of hose clamps for compressing and sealing fluid-carrying hose connections is well known in the art. Such clamps are commonly utilized on flexible hoses in automotive vehicles and in pneumatic and hydraulic devices where hoses are used to carry fluid under pressure or vacuum.

There are several types of screw-type hose clamps in common use. They may be broadly characterized as (1) a band or strip clamp, with tangential screw take-up means (2) a band or strip clamp, with radial screw take-up means, and (3) a wire clamp, with tangential screw take-up means, such as disclosed in Tetzlaff et al, U.S. Pat. No. 3,454,996 granted July 15, 1969. Disclosures of representative tangential and radial band clamps can be found in Tetzlaff et al, U.S. Pat. Nos. 3,407,448 and 3,407,449, both granted Oct. 29, 1968.

A band clamp is a unitary strip of metal or the like, formed in a single loop, and provided with slots or recesses or indentations or the like by means of which the ends of the loop can be drawn towards each other to diminish or reduce the circumference of the loop to compress and seal the flexible hose which it circumscribes. A screw thread is utilized to cooperate with the formations provided on the band to cause the tightening action on the loop.

In its simplest form, a band clamp can be provided with upstanding ears on its ends, which are spaced from each other, and a screw or a bolt and nut traverse the ears to draw them toward each other. However, in this simplified form, there is no overlap of the ends of the band, so the hose is not completely circumscribed and sealed by the clamp. For that reason, the more sophisticated overlap forms of band clamps are more effective and are preferred where complete circumferential sealing is desired.

Similarly, a wire-form clamp can be provided with opposed ears which are traversed by a tightening screw arrangement disposed tangentially to the clamping loops. In more sophisticated form, complete seal can be approached by utilizing an underlying bridging or saddle member to create the effect of overlap and thus embrace the hose in the open area between the opposed ears.

It is commonly accepted and acknowledged in the art that the wire clamp is both a more effective and a less costly hose clamp than the band clamp. The band clamp distributes the hose-compressing force over a broad surface contact area. In contrast, the axially-spaced pair of loops in a wire clamp concentrate the compressing force in the much smaller area established by the diameter of the cylindrical wire elements, thus establishing a more effective seal at each of two axially-spaced areas on the hose. Furthermore, by reason of such axial spacing, the wire clamp could, if desired, be positioned to clamp and seal a hose both in front of and behind the circumferential retaining bead customarily provided on the fixed conduit to which the hose is connected. This function cannot be achieved by the single loop of a band clamp.

For the foregoing reasons, the tangentially-adjusted wire clamp has long been favored over the tangential band clamp in most applications. However, with the increasing emphasis on high productivity and the use of automation and power tools on assembly lines, the tangentially-adjustable clamp created a problem by tending to rotate away from the tightening tool when tangential force was applied to the adjusting screw. The structure of the band clamp had the stability to lend itself to design modification for purposes of mounting the adjusting screw in a radial, rather than a tangential, posture. The radial posture of the screw eliminated the problem of tool-induced rotation of the clamp around the hose during the assembly process. The wire clamp structure could not be successfully adapted to accept a radial adjusting screw, so the clamping and cost advantages of the tangential wire clamp were reluctantly sacrificed to the speed and convenience of the radial band clamp, which eliminated the aforesaid rotation problem.

SUMMARY OF THE INVENTION

The present invention is directed to an improvement in wire grip clamps by means of which the wire form structure is stabilized so that a radially-directed screw take-up can be successfully utilized for tensioning the clamp to achieve sealing compression on a hose body, without tool-induced rotation of the clamp about the hose during assembly. This is accomplished by an appropriate balancing of tensile strength and flexibility in the wire strand, and by providing a configuration to create a balance of forces which overcomes factors of instability which result from the use of wire forms.

BRIEF DESCRIPTION OF THE DRAWING

FIG. 6 is a front elevation of a modified form of wire grip hose clamp embodying the features of the invention.

FIG. 7 is a side elevation of the same, taken from the right side of FIG. 6.

FIG. 8 is a side elevation of the same, taken from the left side of FIG. 6.

FIG. 9 is a top plan view of the hose clamp of FIG. 7.

FIG. 10 is a cross-sectional view, taken as indicated on line 10—10 of FIG. 7.

DESCRIPTION OF THE PREFERRED EMBODIMENTS

Figure 3:
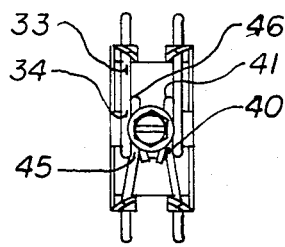
FIG. 3 is a top plan view of the hose clamp of FIG. 2.
Figure 2:
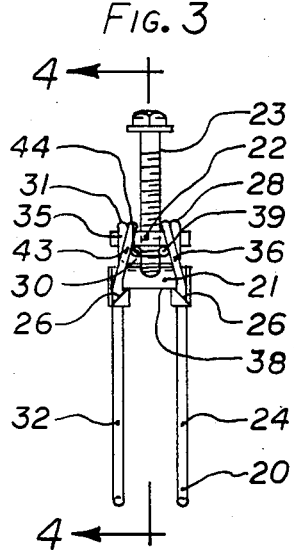
FIG. 2 is a side elevation of the same, taken from the left side of FIG. 1.
Figure 1:
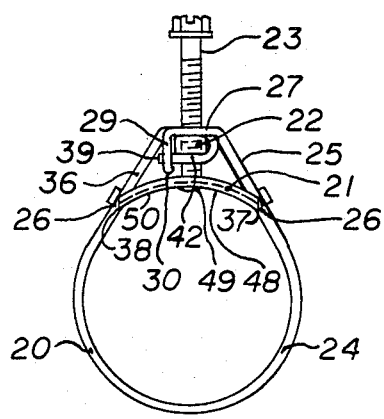
FIG. 1 is a front elevation of a wire grip hose clamp embodying the features of the invention.
Figure 4:
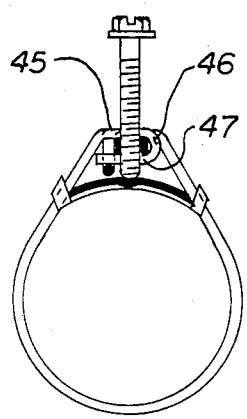
FIG. 4 is a cross-sectional view taken as indicated on line 4—4 of FIG. 2.

Referring more particularly to FIGS. 1-4 of the drawings, there is shown a wire grip hose clamp consisting of four parts: a formed continuous wire strand 20, a seat element 21, a nut 22, and an adjusting screw 23.

The wire strand is formed to provide a first loop 24 of circular configuration, whose circularity is interrupted by a deformed first portion 25 which is directed through a recess 26 in one end 37 of the seat element 21 and extends outwardly from the loop to engage the nut 22. A second portion 27 of the wire strand, adjacent to the first portion 25, is bent over the top of nut 22, as at 28, and then bent downwardly as at 29, to secure the wire to the nut. The second portion 27 is then bent laterally to form a bight 30 which is common to the portion 27 and to a second portion 31 which forms an extension of a second loop 32 formed coaxially with and spaced from the first loop 24.

The second loop 32 is also of circular configuration, interrupted by a deformed first portion 33 thereof, which traverses another recess 26 in the end 37 of seat element 21 and extends outwardly from the loop to engage the nut 22 and join the second portion 31 which is bent over the top of the nut, as at 34, and downwardly as at 35 to join the previously described bight 30.

The first loop 24 is provided with another symetrically disposed deformed first portion 36 which traverses a recess 26 in the opposite end 38 of the seat element 21 and extends upwardly into engagement with the nut 22. The free end 39 of this portion 36 is bent over the top of nut 22, as at 40, in a direction opposite to the direction of the bend 28 and inboard thereof. The end 39 is then bent downwardly, as at 41, and then alongside the underside of the nut, as at 42, to overlie the bight and be mechanically interlocked therewith.

Similarly, the second loop 32 is provided with another symetrically disposed first portion 43 which traverses another recess 26 in the opposite end 38 of seat element 21 and extends upwardly into engagement with nut 22. The free end 44 of this portion is bent over the top of the nut 22, as at 45, and downwardly as at 46, and then underneath the nut, as at 47, in the manner previously described for the other free end 39, so that the free end 44 also is mechanically interlocked with the bight 30.

The seat element 21 is disposed interiorly of the loops 24 and 32 and serves to secure and maintain the loops in the desired predetermined axially-spaced relationship, so that two spaced clamping areas are provided for the hose.

The wire form configuration of the wire body 20 in opposite directions about the nut 22, not only secures the loop structure to the nut for movement therewith, but also secures the nut and stabilizes its posture against lateral displacement from its desired diametrical or radial position relatively to the circular loops.

The screw 23 threadedly traverses and engages the nut 22, and bottoms upon the seat element 21, which serves as a reaction member for rotation of the screw.

The seat element is desirably in the form of a curved saddle element 48 with a nominal radius corresponding to the radius of the hose to be clamped. The element 48 may be dimpled or embossed centrally, as at 49, to provide a well or recess into which the bottom of the screw 23 is conveniently retained against slippage.

In operating the above-described wire grip clamp, it is first slipped over the end of the hose (not shown) and the hose end is then telescoped over the conduit body (not shown) to which it is to be connected in fluid communication. Customarily, such conduit body may be provided with a circumferential bead of enlarged diameter for better frictional retention of the hose.

The hose clamp is then positioned either athwart the bead or wherever else desired so that the loops overlie both the hose and the inserted conduit body. The screw 23 is rotated in a direction (normally clockwise) to draw upwardly or outwardly on the nut 22 and produce a tensile force on the portions 25 and 36 of the first loop 24 and on the like portions 33 and 43 of the second loop 32. The tensile force pulls these portions 25, 36, 33 and 43 through the recesses or apertures 26 of the saddle element 48, deforming the arcuate loops as they pass through the apertures and simultaneously re-forming and straightening the immediately preceding first portions which have already passed through. During this process, the loops 24 and 32 are constricted to a progressively reduced circumference about the hose to clamp it against the conduit at two axially-spaced areas and seal it against fluid leakage. The saddle element 48 bridges the area of hose not directly engaged by the loops and completes the circular sealing area or zone on the hose. Desirably, the saddle element 48 is provided with arcuately embossed edges 50 to provide an extension or continuation of the arcuate pressure area of the wire strand 20 of which the loops are formed.

As the nut is progressively drawn outwardly by the turning of the adjusting screw 23, there is an increasingly greater lever arm imposed on the screw which tends to make the screw unstable and causes it to tip laterally of the loops, rather than remain in the desired radial posture. Such tipping can cause the clamping action of the loops to be uneven and the seal to be ineffective. If the tipping is severe enough, the clamp cannot even be minimally functional and the clamping effect is entirely lost. This is one of the problems which have heretofore prevented development of a radially-adjustable wire hose clamp.

Another problem encountered has been the tendency of the nut 22 to rotate and become angularly displaced in response to rotation of the adjusting screw 23. When the nut remains angularly fixed during its outward movement on the screw 23, the tensile forces applied to the opposite ends of the loops are uniform. However, in the described structure, if the nut starts to rotate, the tensile force on one end of each loop is intensified and the tensile force on the other end of the loop is decreased. This uneven application of tensile force on the loops, caused by the twisting of the nut, can prevent effective sealing constriction of the loops on the hose and can also translate into an undesirable increase in instability of the screw 23 tending to cause the previously mentioned tipping of the screw.

Both of these problems have been overcome by the present invention, to provide an effective and commercially acceptable radial wire hose clamp.

The problem of tipping has unexpectedly been found to be directly related to non-uniformity in the changing length of the first portions 25, 36, 33 and 43 of the loops. When configurations of securement bends were used about the nut 23 in which one portion 25 or 33 was extended to the top of the nut for further bending, and the other portion 36 or 43 was extended to the bottom of the nut for further bending, these respective first portions of the same loop were of unequal length as measured from the recess 26 of the seating element to the point where the nut was engaged by the first portions and the securement bends began about the nut. By directing each of these first portions to engagement with the nut in a manner to make them of equal length, the force vectors on the screw are maintained in balanced opposition and tipping of the screw is prevented.

The problem of the twisting of the nut appeared to lend itself to an obvious solution—utilize a wire strand 20 of such size, tensile strength and flexural strength or resistance to deformation, that the securement bends imposed about the nut would not relax or yield in response to the torsion force imposed on the nut by the adjusting screw 23. However, a wire strand 20 having these characteristics was also so inflexible that the previously described first portions 25, 36, 33 and 43 of the loops would not deform and re-form as the first portions progressively traversed the seat element 21. Furthermore, the wire was substantially more difficult to form during the manufacturing process, making the clamp unduly costly.

By utilizing a wire strand which has the requisite tensile strength for the intended purpose, but is more readily deformable, the high cost of manufacture was eliminated and the ability of tension-induced forming and re-forming of the first portions during sequential traversal of the seating element was achieved. By utilizing the interlock arrangement of the bight 30 and the free ends 39 and 44, and by training the bent second portions 27 and 31 outboard of the free ends 39 and 44, the securement bends do not yield to torsion of the nut and the second portions create an increased lever arm on the nut adequately resisting twist.

Thus, the problems which heretofore prevented effective utilization of a radially-adjusted wire grip clamp were overcome by the configuration of the wire clamp of my invention, as described above.

Figure 5:
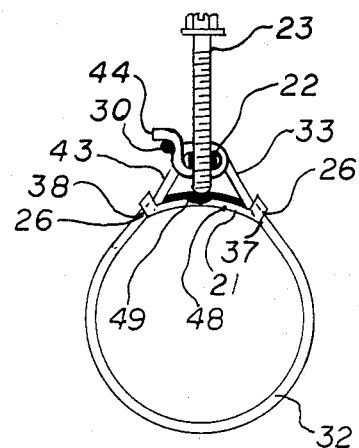
FIG. 5 is a cross-sectional view similar to FIG. 4, but showing a modified form of bending configuration for securement of the nut.

In FIG. 5, there is illustrated a variation of the form of securement bend configuration for the nut 22. In contrast to form of FIGS. 1-4, in the form of FIG. 5 both the bight 30 and the free ends 39 and 44 are mechanically interlocked, in the manner previously described, on the upper side of nut 22, rather than on the underside thereof. In other respects, the form of FIG. 5 is essentially the same as described for FIGS. 1-4, with the critical factors of uniformity of length of the first portions 25, 36, 33 and 43 being maintained to prevent tipping, and the second portions disposed outboard of the free ends 39 and 44 to create the torsion-resisting lever arm, as previously described.

It has previously been noted that the seat element may be in the form of a bridging saddle 48 disposed interiorly of the axially-spaced loops, so as to constitute a circumscribing hose clamping extension of the circularity of the loops. The saddle is customarily made as a metal stamping of fixed radius of curvature, requiring special tooling and dies. Inasmuch as the saddle curvature must reasonably conform to the circumferential curvature of the hose to be clamped for effective sealing, several differently-sized saddle elements must be manufactured to cover the range of hose sizes to which the clamps are ordinarily applied. Each different radius of saddle curvature requires a different set of stamping dies. Thus, the variety of sizes involves a multiplicity of tooling costs for the saddles, as well as the necessity for maintaining an inventory of each separate size.

To overcome the increased cost necessitated by the above, the invention contemplates a radially-adjusted wire grip clamp 51, shown in FIGS. 6-10 of the drawings, which embodies the advantages previously discussed with respect to the embodiments of FIGS. 1-4 and 5, but in a simplified and modified form.

In this modified form, there are a pair of coaxial, axially-spaced wire loops 52 and 53 portions of which overlap, as at 54, so that the loops are essentially completely circular, without any significant interruption in their circularity.

The seat element 21 is in the form of a flat plate 55, mounted exteriorly of the loops, and provided on each laterally-disposed edge 56-57 thereof with a pair of spaced recesses 26.

The loop 52 has a first portion 58 which traverses the plate 55 through recess 26 on lateral face 56 and extends upwardly to engage nut 22. A second portion 59 joins portion 58 and is bent into a bight 60 about the nut 22. The free end 61 of loop 52 is bent and rebent about the seat 21, as at 62.

Similarly, the loop 53 has a first portion 63 which traverses plate 55 through recess 26 on lateral face 57 and extends upwardly to engage nut 22 in a direction of opposite hand to that of loop 52. A second portion 64 joins portion 63 and is bent around nut 22 into the bight 60, common to portions 59 and 64. The free end 65 of loop 53 is bent and rebent, as at 66, about the seat 21, but in a direction of opposite hand to that of the free end 61 of loop 52.

The adjusting screw 23 threadedly traverses nut 22 and seats on element 21 in a radially disposed posture relatively to the circular loops 52 and 53.

In operation, rotation of screw 23 draws upwardly on nut 22 to tension the first portions 58 and 63 to progressively form and re-form the first portions as they traverse the seat element 21. Simultaneously, the loops are constricted into sealing engagement with a hose to be clamped, as the bight 60 moves upwardly relatively to the anchored free ends 61 and 65 of the loops.

The first portions 58 and 63 are of equal length and engage the nut 22 from opposite directions to maintain a balance of forces on the screw 23 to prevent undesirable tipping of the screw to a non-radial posture.

The free ends 61 and 65 are bent into a configuration to secure the seat element 21 against vertical displacement and to anchor the terminal ends of the loops.

If there is any tendency of the nut 22 to have torsion-induced rotation or angular displacement, such twist of the nut is resisted by the bight formation 60. However, to the extent that some twist of the nut 22 may occur, the clamp of FIGS. 6-10 can tolerate it without adverse effect upon the sealing function, as the configurations of opposite hand counter-balance the effects of such twist. It will be noted that, in contrast to the embodiments of FIGS. 1-4 and 5, twist of the nut would cause a like change in tension on both loops and their first portions 58 and 63, respectively, so that no imbalance of tensile forces would be created. By reason of this configuration, a unit vertical displacement of nut 22 in the clamp of FIGS. 6-10 creates only one-half the circumferential constriction of the loops as is created by a like unit vertical displacement of nut 22 in the clamps of FIGS. 1-4 and 5.

Thus, by disposing the seating element 21 exteriorly of the loops 52, 53, the loops can completely circumscribe the clamped hose. Therefore, there is no necessity for imposing a radius of curvature on the seating element, as is the case when the saddle element 48 is utilized and disposed interiorly of the loops. The seat element can be of a single form and size for all sizes of clamps within the range of hoses to be clamped, thereby eliminating a multiplicity of special tooling and, also, minimizing inventory stockage.

Stability of radial disposition of the adjusting screw is maintained, while the effects of torsion-induced twist of the nut are counter-balanced and nullified.

Whether one utilizes the clamp of FIGS. 1-4 and 5, or the clamp of FIGS. 6-10, disclosed herein, it will be apparent that a stable, commercially effective, radial wire grip hose clamp has been created utilizing the principles of my invention.

It is to be understood that the forms of my invention herein described are preferred examples of the same, and that various changes can be made without departing from the spirit of the invention as defined in the appended claims.

Having thus described my invention, I claim:

1. An adjustable wire grip hose clamp, comprising:

a wire body providing a pair of circular clamping loops in axially-spaced relationship to each other, a common seat element having means at each end for receiving therethrough a first portion of each of said loops for attachment of said seat element to said loops and for maintaining said loops in said axially-spaced relationship, each of said loops having a deformed first portion thereof traversing said seat element, said first portion being sequentially deformable by said seat element in response to constricting movement of said loop, a threaded nut proximate to and radially spaced from said seat element, said first portion extending from said seat element to said nut, a second portion of said wire body extending from said first portion and bent into securement with said nut, and a radially-extending adjusting screw threadedly engaging and traversing said nut and seating on said seat element, whereby screw-induced elevation of said nut relatively to said seat element progressively tensions said loops simultaneously to create sequential re-formation of said deformed first portions relatively to said seat element and constriction of said loops into clamping engagement with a hose embraced thereby.

2. A hose clamp as defined in claim 1, wherein said pair of loops are formed of a single strand of wire.

3. A hose clamp as defined in claim 2, wherein the first portion of one loop engages said nut in opposition to the first portion of said other loop, and said first portions are equal in length, one with the other.

4. A hose clamp as defined in claim 3, wherein each of said loops has a free end, and each of said free ends is bent into anchoring securement with said nut.

5. A hose clamp as defined in claim 3, wherein each of said loops has a free end, and each of said free ends is bent into anchoring securement with said seat element.

6. A hose clamp as defined in claim 3, wherein said wire is characterized by a tensile strength sufficient to effect sealing compression of a hose to which it is applied, and a flexural strength sufficient to accept sequential re-formation by said seat element, without fracture.

7. A hose clamp as defined in claim 3, wherein said seat element is disposed interiorly of said loops.

8. A hose clamp as defined in claim 3, wherein said seat element is disposed exteriorly of said loops.

9. A hose clamp as defined in claim 7, wherein said seat element is a curved saddle plate, each end of said saddle plate having a pair of guide recesses traversed by said first portions of said loops, said free ends of said pair of loops are bent around said nut into securement therewith and project in the same circumferential direction therefrom, and said second portions terminate in a bight bent around said nut in opposition to and underlying said free ends, whereby said bight and said free ends each mechanically interlock with the other for stabilizing said nut and preventing rotation of said nut during screw-induced movement thereof.

10. A hose clamp as defined in claim 9, wherein said saddle plate bridges each of said loops to circumferentially engage that portion of a clamped hose not engaged by said loops.

11. A hose clamp as defined in claim 9, wherein said free ends of said loops extend inboard of said nut, and said second portions extend outboard of said free ends to establish a greater lever arm on said nut than is established by said free ends.

12. A hose clamp as defined in claim 8, wherein each of said loops substantially defines a complete hose-engaging circle, said free ends of each loop are bent about said seat element in opposition to each other, said first portions of each loop engage said seat element and said nut in opposition to each other, and said second portions are bent and rebent about said nut in a bight common to said second portions and intermediate said first portions, whereby said seat element and said nut are stabilized to maintain radial alignment relatively to said loops during screw-induced constriction thereof.

13. A hose clamp as defined in claim 12, wherein said second portions are bent about said nut in a direction transverse to the direction of bend of said free ends about said seat element.

* * * * *